United States Patent [19]

Wu

[11] Patent Number: 5,193,018
[45] Date of Patent: Mar. 9, 1993

[54] ACTIVE MATRIX LIQUID CRYSTAL DISPLAY SYSTEM USING COMPLEMENTARY THIN FILM TRANSISTORS

[75] Inventor: Biing-Seng Wu, Hsin-Chu, Taiwan

[73] Assignee: Industrial Technology Research Institute, Hsinchu, Taiwan

[21] Appl. No.: 783,575

[22] Filed: Oct. 28, 1991

[51] Int. Cl.[5] .............................................. G02F 1/13
[52] U.S. Cl. ............................................. 359/59; 359/68
[58] Field of Search ....................... 359/54, 58, 59, 68; 340/784

[56] References Cited

U.S. PATENT DOCUMENTS

| 4,469,718 | 11/1990 | Noguchi et al. | 359/68 |
|---|---|---|---|
| 4,653,862 | 3/1987 | Morozumi | 359/68 |
| 4,775,861 | 10/1988 | Saito | 359/59 |
| 4,781,438 | 11/1988 | Noguchi | 359/68 |
| 4,834,505 | 5/1989 | Migliorato et al. | 359/59 |
| 4,995,703 | 2/1991 | Noguchi | 359/59 |

FOREIGN PATENT DOCUMENTS

| 0144297 | 12/1978 | Japan | 359/59 |
|---|---|---|---|
| 0068724 | 3/1989 | Japan | 340/784 |
| 0130133 | 5/1989 | Japan | 359/59 |
| 1130131 | 5/1989 | Japan | 340/784 |
| 0130524 | 5/1990 | Japan | 340/784 |
| 0186325 | 7/1990 | Japan | 359/59 |

Primary Examiner—William L. Sikes
Assistant Examiner—Huy K. Mai
Attorney, Agent, or Firm—H. C. Lin

[57] ABSTRACT

A matrix display system includes an active matrix display device having an array of liquid crystal picture elements (pixel) with associated switches using thin film transistors (TFT). The pixels are arranged in groups, each having two pixels and switched by two complementary TFTs. The n-channel TFTs are switched on by a positive pulse and the p-channel TFTs are switched on by a negative pulse. The two switching signals are alternately fed from a row conductor which feeds both the n-channel TFTs and the p-channel TFTs on the same row. Each group of the two TFTs are addressed via the same row conductor and the same column conductor, which carries the data signal. In this way, either the number of row conductors are reduced by one half or the number of column conductors are reduced by one half.

16 Claims, 21 Drawing Sheets

ACTIVE MATRIX LIQUID CRYSTAL DISPLAY SYSTEM USING COMPLEMENTARY THIN FILM TRANSISTORS

TECHNICAL FIELD

This invention is in the field of active matrix thin film transistor (TFT)/liquid crystal display (LCD). In particular, a method is set forth for reducing the number of scan lines or data lines.

BACKGROUND OF THE INVENTION

There is a great need for high resolution thin film transistor/liquid crystal displays (TFTLCD) in a wide range of possible applications ranging from portable computers and test equipment to high resolution projection TV. Such displays typically consist of a large number of picture elements (pixel) arranged in an active matrix. For a display system where the electro-optical medium is liquid crystal, each pixel is defined by a dedicated electrode on one side of two opposite transparent substrates and another electrode, which is common to all pixels and faces the viewer.

FIG. 1 illustrates, in the form of an equivalent circuit, a prior art TFTLCD device. Each pixel in the active matrix comprises a TFT switch and a liquid crystal (LC) capacitor. The TFT gate electrodes in all the cells of a row are connected to a common horizontal gate bus, while the TFT sources in all the cells of each column are connected to a vertical data bus. The cells are addressed in a "line-at-a-time" or line-by-line mode. The timing waveforms for the display are also shown in FIG. 1. By pulsing a gate bus to a positive potential relative to the source potential during the addressing interval for a particular row, the TFTs in that row are all switched on. At the same time, the data signal voltages on the source busses are transferred to the TFT output electrodes (drains) and the LC capacitors. When the gate bus is switched off as the next row is addressed, the data signals are stored on the capacitors until the next addressing cycle for that particular row in the succeeding frame.

In order to obtain a full color display, a color filter mosaic of red, green and blue filter elements is placed on other substrates which are parallel to and spaced from the active matrix glass substrate to transmit lights of different colors. The elements of the filters are registered with the pixels so that each pixel is dedicated to one of the three primary colors. Group of juxtaposed red, green and blue pixels constitute color triplets whose primary color outputs combine to provide a multi-color display capability. By driving the array of pixels with appropriate red, green and blue data signals, a full color picture is produced.

It can be noted that with the above-described display system the number of row and column conductors needed corresponds to the number of rows n and columns m for n×m pixels. In addition to the need to devote a portion of area of the display device to accommodate the row and column conductors, there is also a possibility that, in view of the large number of conductors used, one or more of these conductors may be defective, rendering the display device unusable. This problem is quite common at the cross-overs of row and column conductors. Obviously, the more conductors are employed, the greater this possibility becomes to adversely affect to yield of a large area display device.

Furthermore, the large number of row and column conductors cause problems with the production of small area display devices which are used for projection display. Large area displays can be obtained from small area TFTLCD by using a projection system in which the image produced by the small area display is projected onto a large area screen. However, in order to provide the desired display resolution after projection, the display device generating the image should have adequate number of rows and columns of pixel density. If the number of the row and column conductors is large, a large portion of the display area is occupied by the conductors and the aperture ratio (i.e., display area where light can transmit/total area) on the display is small. Then the display exhibits low light levels.

An active matrix display system which can reduce the number of conductors is proposed in the U.S. Pat. No. 4,931,787, entitled "Active matrix addressed display system" by John M. Shannon. This patent proposed a TFTLCD system in which all the TFTs in the active matrix are n-channel amorphous TFTs arranged in groups. Each group contains a number of juxtaposed pixels sharing the same column and row conductors, as shown in FIG. 2(a). The TFTs of each group are fabricated to have different threshold voltages, i.e. TFT1, TFT2 and TFT3 have threshold voltages Vt1, Vt2 and Vt3 respectively. For Vt1 higher than Vt2 and Vt2 higher than Vt3, FIG.2(b) shows a part of a typical waveform for the switching signal Vg applied to a single row conductor. FIG.2(c) shows an example of video information waveform Vs for a single column waveform. At the beginning of a selected row energization period, the switching signal is at a high level, and all the TFTs, i.e. TFT1, TFT2 and TFT3, are switched on as this high voltage level exceeds all their threshold voltages. Simultaneously, the information signal S1 is applied to the associated column conductor, and is transferred to the drain electrodes of the TFTs so that all three pixel electrodes are charged to S1. At a certain time thereafter, the signal drops to an intermediate voltage level. At this time interval, TFT1 is turned off, and TFT2 and TFT3 are still on. Simultaneously with this intermediate switching signal level, the information signal applied to the column is changed to S2, and the pixel electrodes in contact with TFT2 and TFT3 are charged to S2. Then, after another predetermined period, the signals drops to a low level before finally dropping to zero, at which time both TFT1 and TFT2 are turned off and TFT3 is still on and the information signal is changed to S3. The pixel connected to TFT3 is then charged to S3.

Unfortunately, it is difficult to fabricate TFTs with different threshold voltages in the same process. Although using very complicated manufacturing process or connecting different capacitors in series with gate electrodes of different TFTs can make the TFTs to have different threshold voltages (i.e. Vt1, Vt2 and Vt3 for TFT1, TFT2 and TFT3 respectively), the threshold voltages cannot be controlled uniformaly within the whole large display area. If the threshold voltage of a TFT has a lower threshold voltage than its designed value, the leakage current makes the pixel not to hold the information signal during the subsequent period. That is, the electrode contact to TFT1 is charged to S2 if the threshold voltage of TFT1 is lower than its designed value. Then, the pixels address the wrong signal.

Another disadvantage of Shannon's method is the low noise margin of the switching signal. The TFTs are n-channel TFTs and the threshold voltage differences are small. As a result, the display has low switching signal noise margins.

SUMMARY OF THE INVENTION

It is an object of this invention to provide an active matrix addressed display system in which one half of the data lines or one half of the scan lines can be eliminated. That is, for a display of n×m pixels, the number of row conductors can be reduced to n/2, or the number of column conductors can be reduced to m/2. Another object of the invention is to provide a thin-film transistor liquid-crystal display which has a larger aperature ratio than the conventional TFTLCD. Still another object of this invention is to provide a high resolution active matrix display design method in which two TFTs are sharing the same row conductor and/or the same column conductor, and the display is robust to the nonuniformity of threshold voltage of the TFTs within a large wafer. A further object of this invention is to provide an active matrix display which has high switching signal noise margin.

According to the present invention, one half of the pixels are controlled by n-channel TFTs and another half of the pixels are controlled by p-channel TFTs as shown in FIG. 3. The pixels are arranged in groups. Each group consists of a pair of TFTs, an n-channel TFT and a p-channel TFT, as shown in FIG. 4. The sources of the TFTs are connected to two different transparent electrodes, such as indium tin oxide (ITO) of the liquid crystal. The gates of the p-channel TFT and the n-channel TFT within a group are sharing the same row conductor and the drains are sharing the same column-conductor. If the p-channel TFT and the n-channel TFT in each group are located on different sides of the row conductor, only n/2 row conductors are needed for a n×m display. Similarly, if the p-channel TFT and the n-channel TFT in each group are located on the different sides of the column conductor, only one half of the column conductors are needed, i.e., m/2 column conductors for the n×m pixel display.

Two opposite switching signals are used to drive the TFTs in each group of the display, as shown iin FIG. 6(a). The switching signal applied to each row conductor is a positive pulse and a negative pulse. When the positive pulse is applied to a row conductor, the n-channel TFTs connected to the row conductor are switched on, and the video signals applied to the column conductors are transferred to their respective pixels through the n-channel TFTs. When the negative pulse is applied to a row conductor, the p-channel TFTs connected to the row conductor are switched on, and the video signals applied to the column conductors are transferred to their respective pixels through the p-channel TFTs.

The threshold voltage of the n-channel TFT has a positive value and that of the p-channel TFT has a negative value. Hence, the noise margin of the switching signal is quite high.

DETAILED DESCRIPTION OF THE PREFERRED EMBODIMENT

Figure 1:
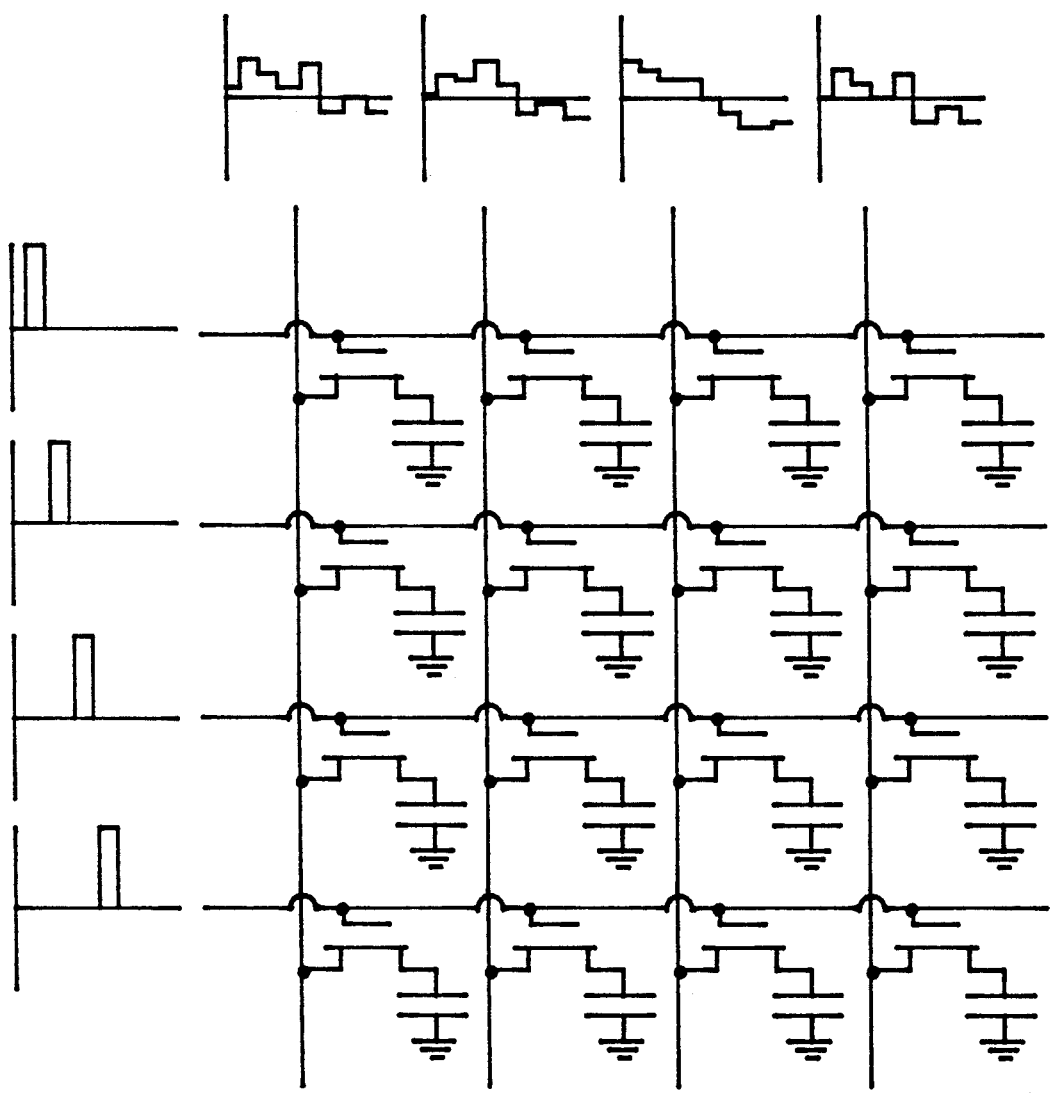
FIG. 1 shows the equivalent circuit of a conventional TFTLCD display device. The switching signals of the row conductors and data signals of column conductors are also shown in the figure.
Figure 2A:
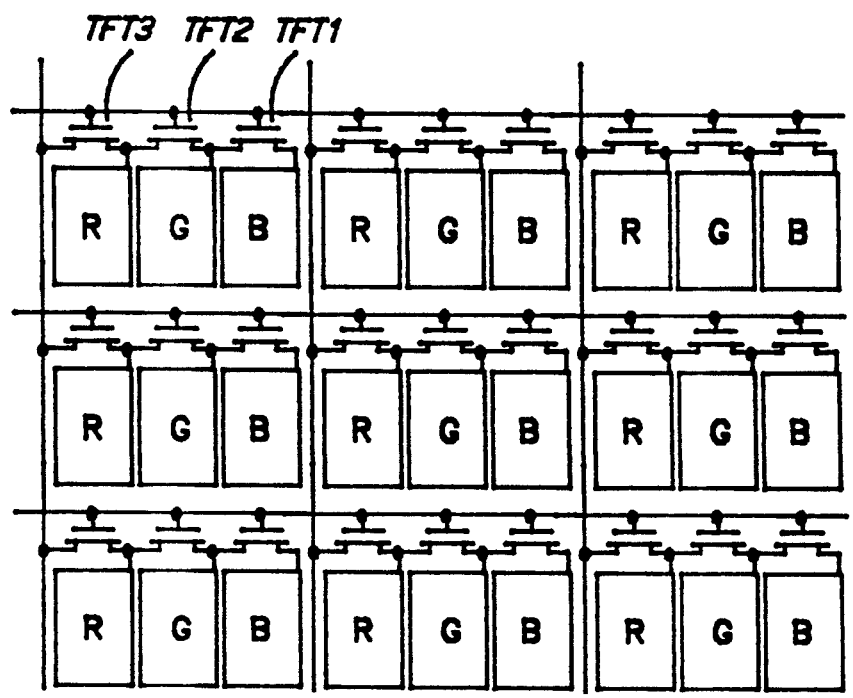
FIG. 2 shows the (a) the equivalent circuit of the prior art invention to reduce the number of conductors, (b) typical switching signal of the prior art method, (c) typical column waveform of the prior art method.
Figure 2B:
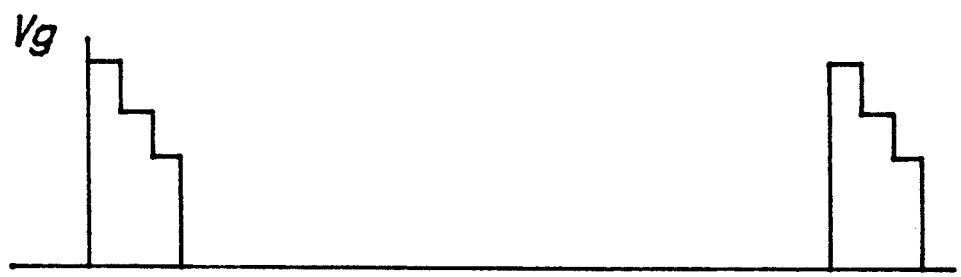
Figure 2C:
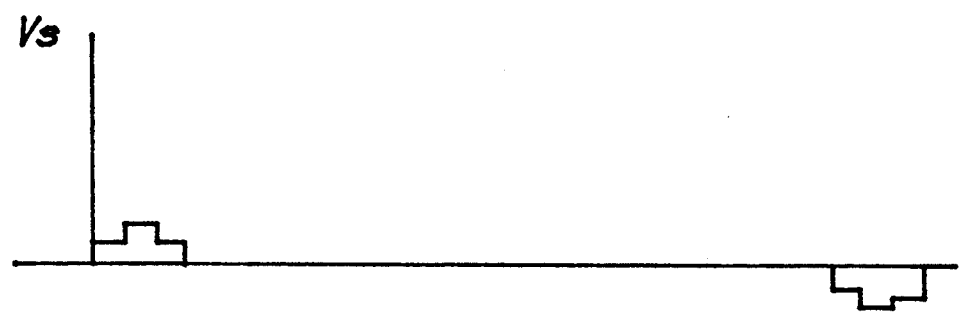
Figure 3:
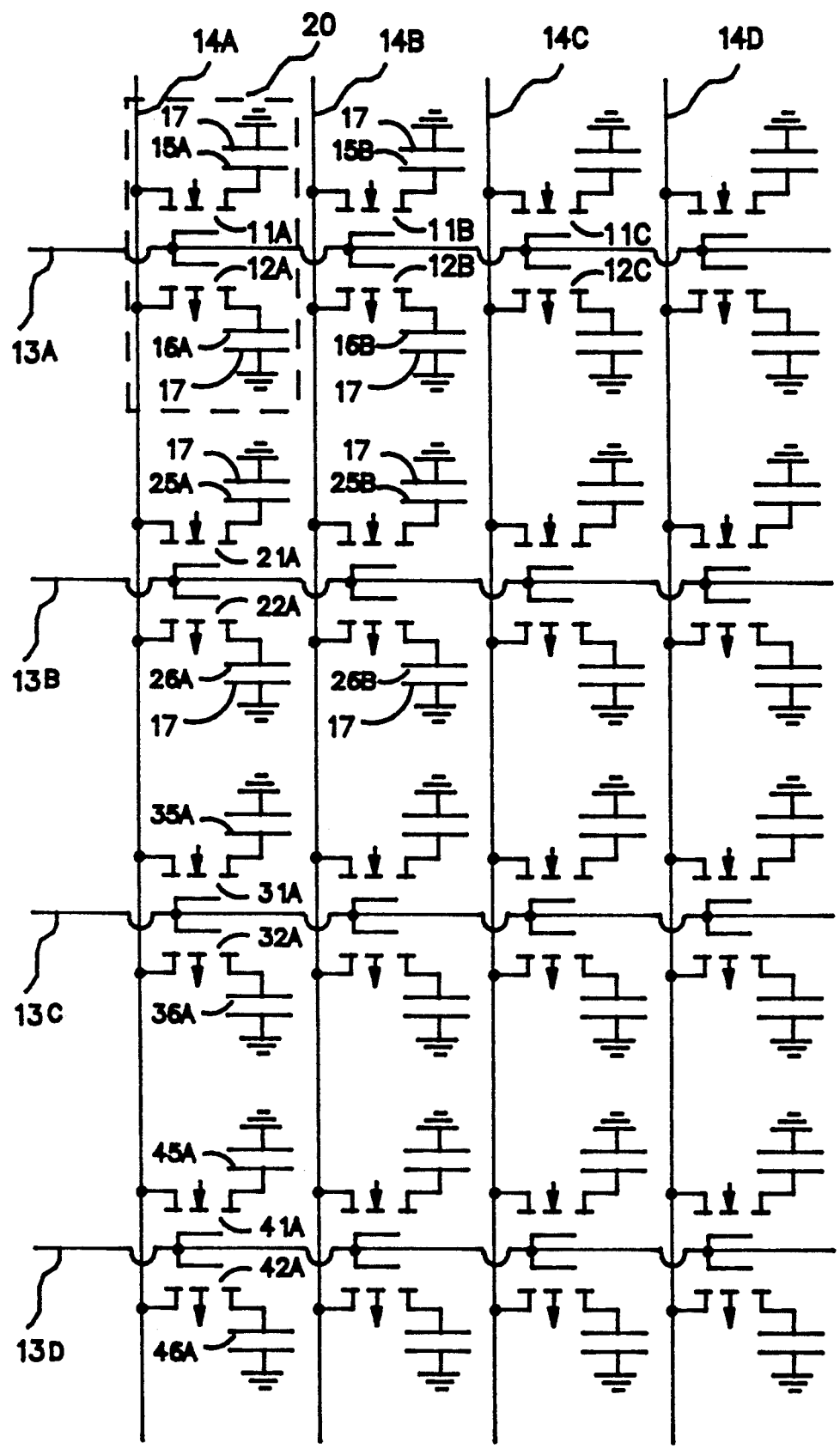
FIG. 3 shows the first type of display system based on this invention. The pixel arrangement can reduce one half of row conductors. Only an 8×4 pixel array is indicated in the figure. In practice, the number of pixels may be more than one million.

Referring to FIG. 3, a simplified block diagram of this invention is shown. The matrix display system includes an active matrix LCD panel consisting of n rows (from 1 to n) with m (from 1 to m) vertically-aligned pixels in each row. Only a few of these pixels are shown in FIG. 3 for simplicity. Each pixel has an associated switching element in the form of an n-channel TFT, or a p-channel TFT. The base material of the TFTs is polycrystalline silicon or amorphous silicon.

Figure 4:
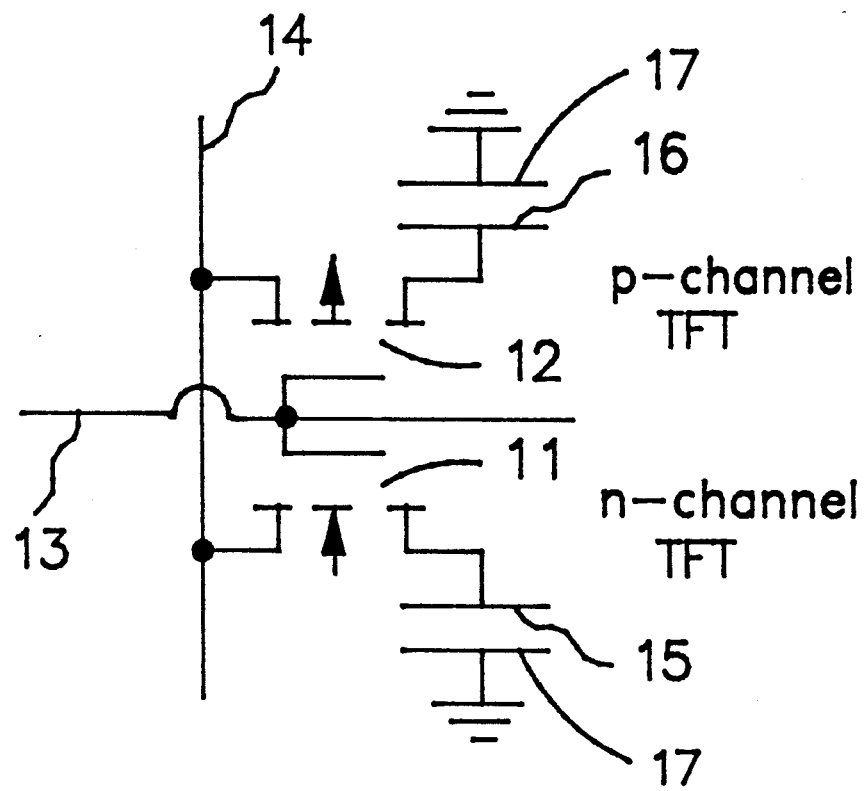
FIG. 4 shows the p-channel TFT and the n-channel TFT in each group of the display shown in FIG. 3.

In accordance with this invention, the pixels of an active matrix liquid crystal display are arranged in groups, each comprising a pair of TFTs and a pair of ITO electrodes as shown in FIG. 4. One of the TFTs in each group is an n-channel TFT 11, and the other one is a p-channel TFT 12. The gate electrode of the n-channel TFT 11 and the gate electrode of the p-channel TFT 12 are sharing the same row conductor 13. The drain electrode of the n-channel TFT 11 and the drain electrode of the p-channel TFT are sharing the same column conductor 14. The source electrode of the n-channel TFT 11 is connected to an ITO electrode 15 of a liquid crystal pixel, and the source electrode of the p-channel TFT 12 is connected to another ITO electrode 16 of another liquid crystal pixel. A pixel can have either an n-channel TFT connected to its corresponding ITO electrode or a p-channel TFT connected to its corresponding ITO electrode.

A number of these groups constitutes an active matrix array, as shown in FIG. 3. The gate electrodes of the n-channel TFTs 11A, 11B, 11C and the gate electrodes of the p-channel TFTs 12A, 12B, 12C in a horizontal line are connected to a row conductor 13A. The drain electrodes of the n-channel TFTs 11A, 21A, 31A and the drain electrodes of the p-channel TFTs 12A, 22A, 32A in a vertical line are connected to a column conductor 14A. The source electrode of each TFT is connected to its respective ITO electrode.

The active matrix array is formed on a transparent glass substrate. The color filters and a common counter electrode 17 for all the pixels are carried on another substrate extending parallel to and spaced from the active matrix glass substrate. A layer of liquid crystal material is disposed between these two substrates. The color filter includes red filter elements "R", green filter elements "G", and blue filter elements "B", which are positioned above the respective display elements, i.e., the ITO electrodes. On a line of pixels, whether they are controlled by the n-channel TFT or the p-channel TFT 12, the arrangement of the red filter elements, the green filter elements and the blue filter elements is repeated. The repetition of the filter element arrangement is shifted between neighboring line of the pixel as shown in in FIG. 5.

Figure 6A:
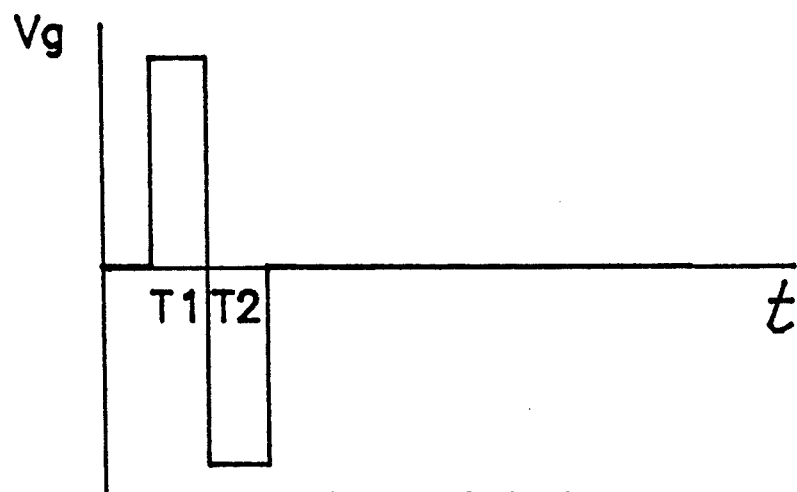
FIG. 6 shows how the input signals of the display in FIG. 3 are applied to (a) row conductor 13A, (b) row conductor 13B, (c) column conductor 14A.
Figure 6B:
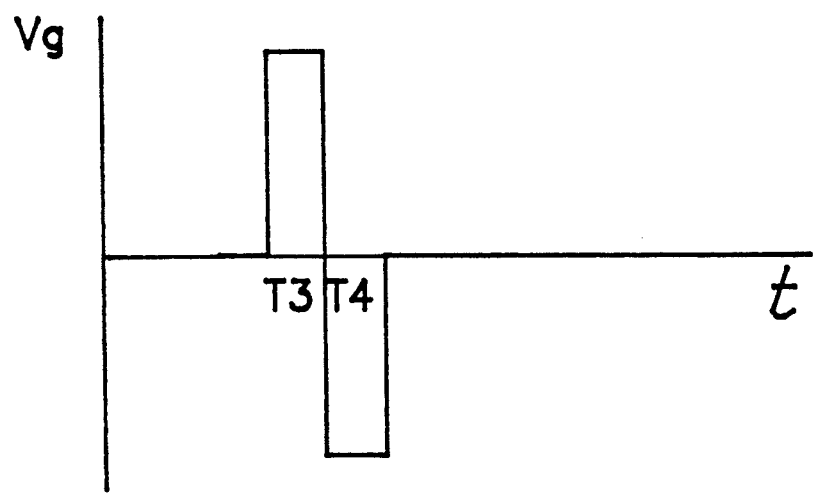

Row addressing of the matrix array of picture elements is achieved by applying a positive switching signal to a row conductor 13 during the time period T1. After the positive switching signal, the row conductor 13 is applied with a negative switching signal during the time period T2 as shown in FIG. 6(a). If the switching signal of FIG. 6(a) is applied to the first row conductor 13A of FIG. 3, then during T1 the n-channel TFTs 11A, 11B, 11C connected to this row conductor 13A are switched on, and their respective ITO electrodes are supplied with data signals via column conductors 14A, 14B, 14C. At this time period, the p-channel TFTs 12A, 12B, 12C connected to the row conductor 13A are switched off. Similarly, during T2, the p-channel TFTs 12A, 12B, 12C are switched on, and the video information signals are transferred to the pixels via the column conductors 14A, 14B, 14C. The input voltage of the row conductor 13A isd biased at zero voltage for the rest of the frame time and the transistors associated with the pixels in the row conductor 13A are switched off, and it function is to hold the video voltage across its associated pixel by virtue of the stray capacitance of the pixel. The row conductors 13 are sequentially addressed by the switching signals to provide row scanning. FIG. 6(b) shows the switching signal for the subsequent row conductor 13B. The liquid crystal is effectively driven by a series of switching signals.

The liquid crystal cell is driven by an AC voltage. The polarity of the driving voltage is required to invert every other field. In the positive field, the energized liquid crystal cells are charged with positive video signals, and in the negative field the liquid crystal cells are charged with negative video signals. The row conductors of the display are biased at zero bias except the energized row conductor. If the threshold voltages of the TFTs are lower than the maximum video signal voltage, the n-channel TFTs cannot be switched off during the positive frame. In order to hold the video voltage across its associated pixel, the threshold voltages of the n-channel TFT and the p-channel TFT are designed to be higher than the maximum video voltages.

Figure 5:
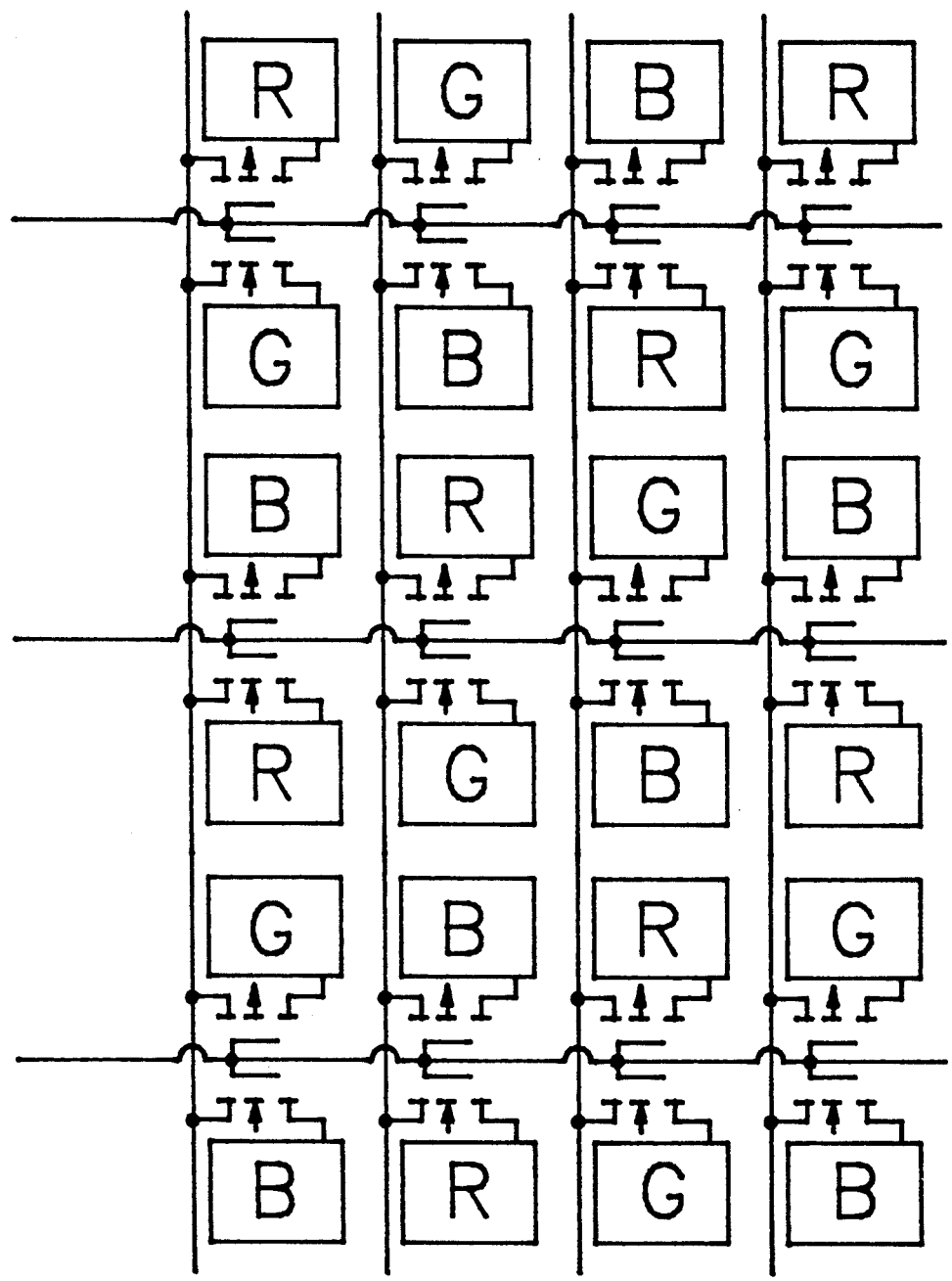
FIG. 5 shows an example of the a color filter arrangement of the display in FIG. 3.
Figure 7A:
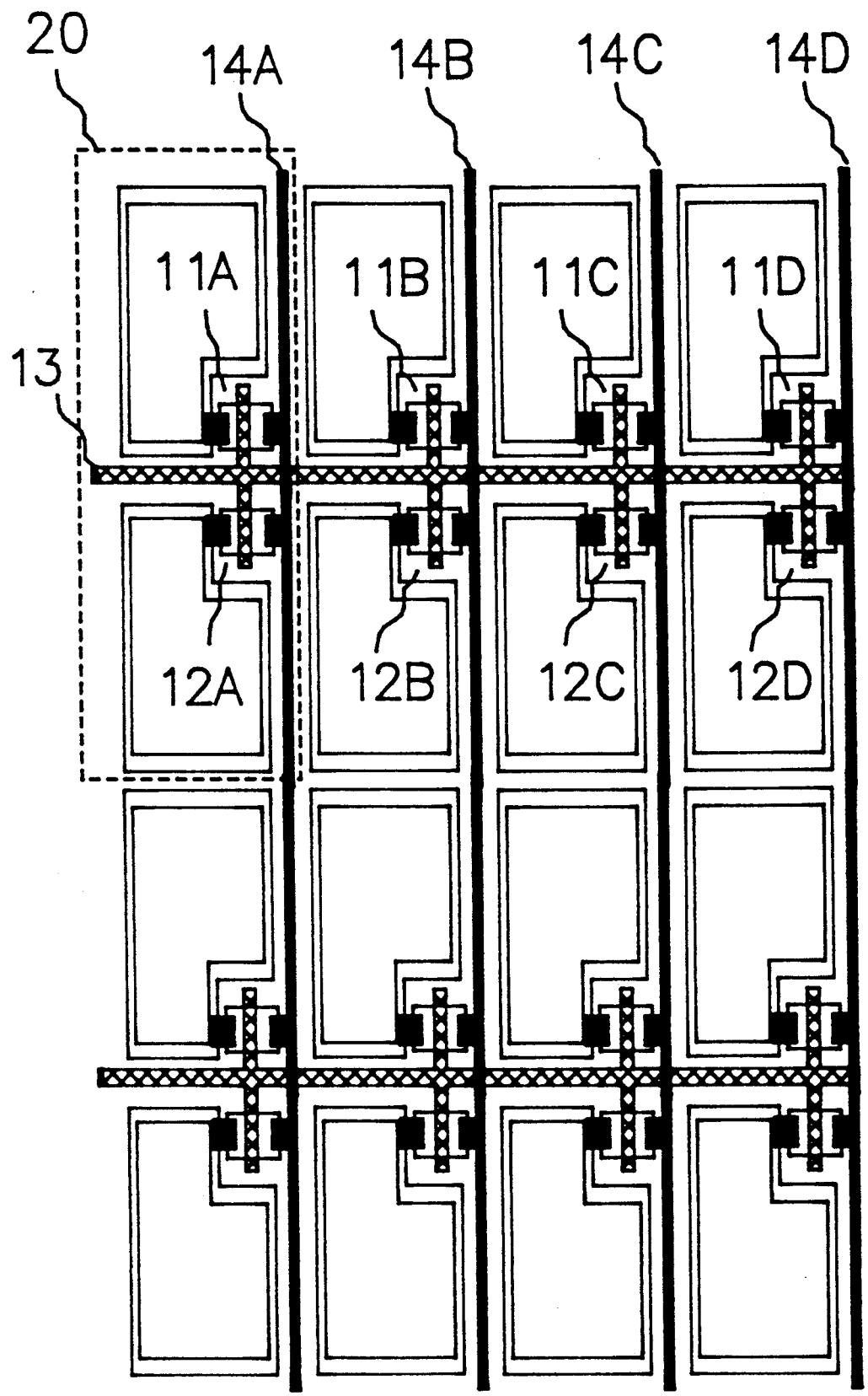
FIG. 7(a) shows the TFTLCD pixel layout of this invention with the first type of pixel arrangement.
Figure 7B:
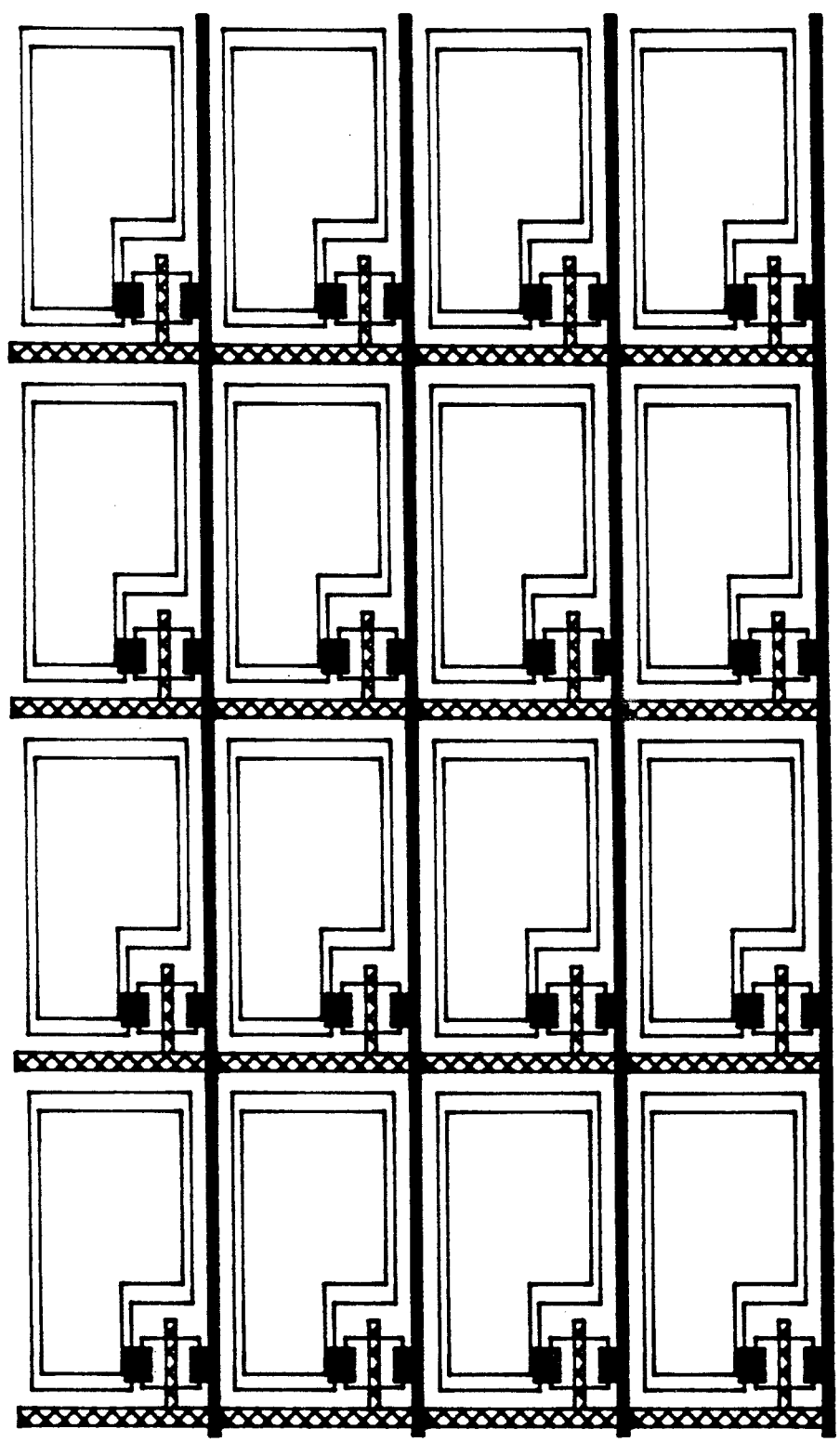
FIG. 7(b) shows a typical TFT array layout for a conventional TFTLCD for comparison.

There are many kinds of possible TFTLCD layout for this invention. FIG. 7(a) shows the first example which can reduce one half of the row conductors in FIG. 3. The pixels of each group are located on the different sides of the row conductor 14. Each group, such as that indicated by the dotted line 20 in FIG. 3 and FIG. 7(a), comprises an n-channel TFT 11 and a p-channel TFT 12. The n-channel TFT 11 is located on the upper side of the row conductor 13, and the p-channel TFT 12 is located on the lower side of the row conductor 13, or vice versa. The row conductor 13 is shared by the p-channel TFT 11 and the n-channel TFT 12 in the group and by other similar groups of pixels in the same row. FIG. 7(b) shows the conventional TFTLCD layout for comparison. The TFTs and the ITO electrodes in FIG. 7(a) and FIG. 7(b) have the same dimensions. However, one can observe that the total array area of FIG. 7(a) is smaller than that of FIG. 7(b), meaning that the aperture ratio and pixel number of this invention can be made larger than that of TFTLCDs. The color filter arrangement is shown in FIG. 5, and this arrangement is similar to that of the conventional TFTLCD.

Figure 10:
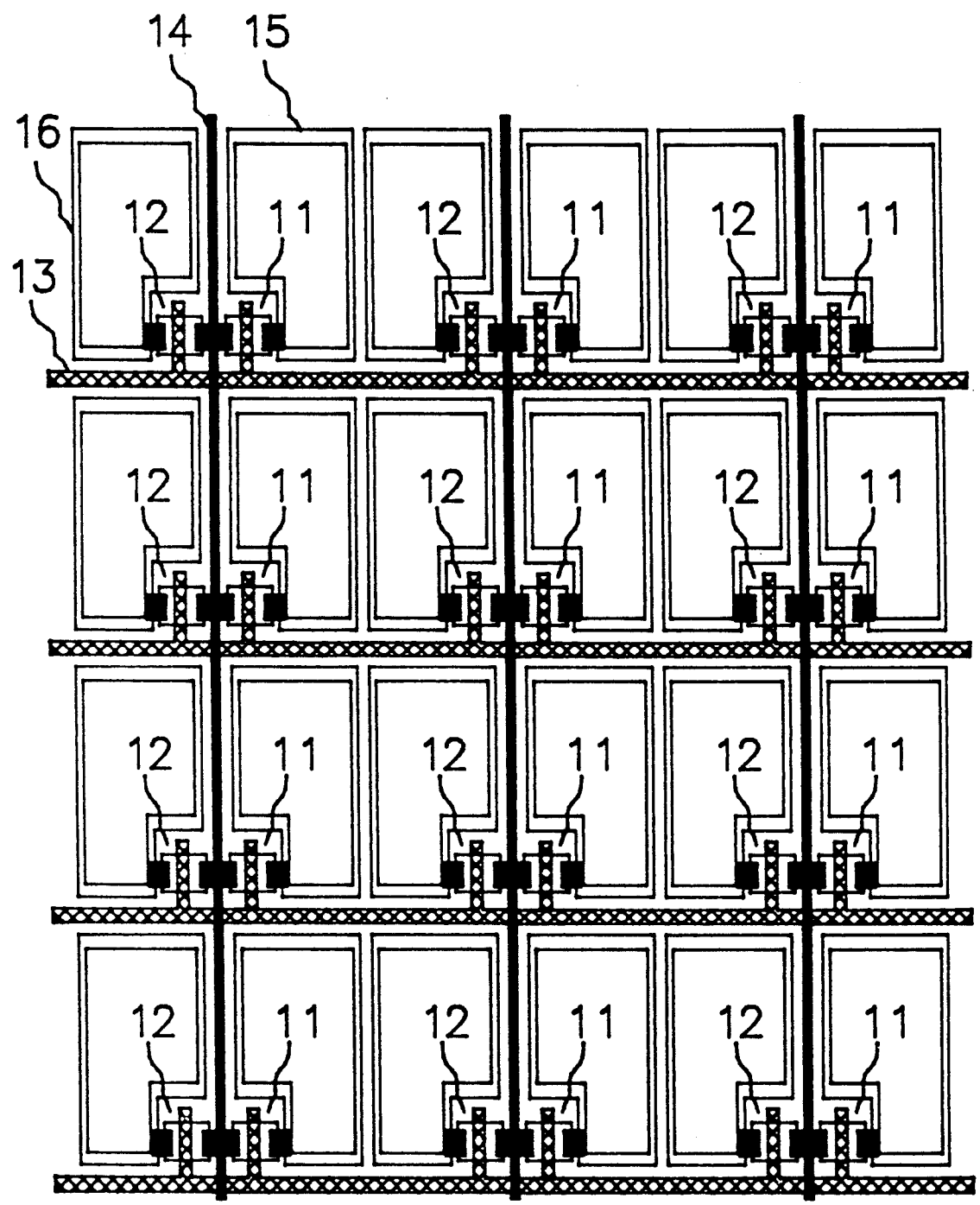
FIG. 10 shows the TFTLCD pixel layout with the second type of pixel arrangement of this invention.

FIG. 6(a) shows a part of the waveform for the switching signal applied to the row conductor 13A in FIG. 3. Each duration of T1 and T2 corresponds approximately to the energized duration of a row, as shown in FIG. 10. For a TV display, this duration is equal to the time period. As showin FIG. 10(a), the pixels in the upper side of the first row conductor are energized during T1. The, the pixels in the lower side of the first row conductor are energized during T2. After T1+T2, the same waveform is applied to the next row conductor 13B, ecxept that the waveform is delayed by T1+T2. FIG. 6(b) illustrates the waveform applied to conductor 13B, which appears at the next row conductor of 13A. The waveform is repeated and applied to the row conductor 14 sequentially.

Figure 6C:
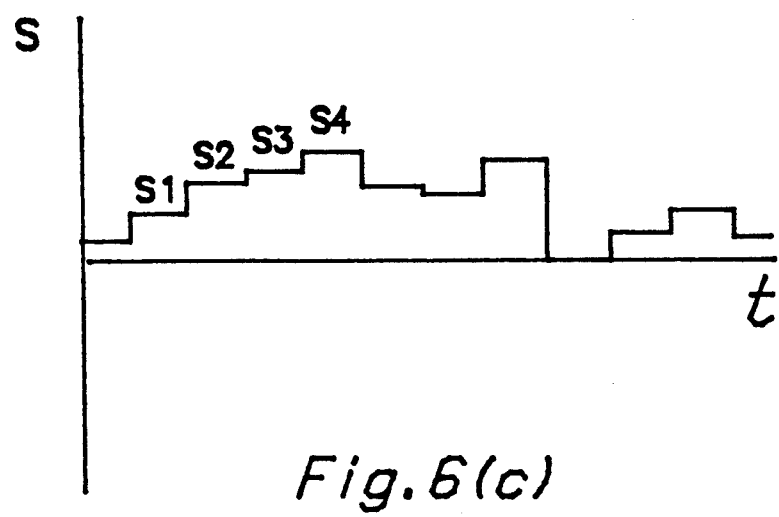

In synchronism with these switching signal sequences and under the control of the timing and control circuit, video information (i.e., data signals) S for the pixels of the display are applied to the relevant column conductor 14. FIG. 6(c) shows an example of video information for a column conductor 14A where the voltages to be suppled to the pixel electrodes 15A, 16A, 25A and 26A of FIG. 3 are designated S1, S2, S3 and S4, respectively.

During T1, the n-channel TFTs connected to the row conductor 13A are turned on, and the p-channel TFTs are turned off. The information signal S1 is applied to the associated column conductor 14A and is transferred to the source electrode of the n-channel TFT 11A, so that the pixel electrode 15A is charged to S1. During T2, the p-channel TFTs 12 connected to the row conductor 13A are turned on and the n-channel TFTs 11 are turned off. The information signal S2 is applied to the column conductor 14A, so that the pixel electrode 16A is charged to S2. At the same time, the pixel electrode 15A remains at S1, because the n-channel TFT 11 is turned off. After T1+T2, all the TFTs (n-channel TFTs and p-channel TFTs) connected to the row conductor 13A are switched off, and the information signal is not transferred to the pixel electrode 15A and 16A. At time period T3, the n-channel TFTs connected to row conductor 13B are switched on, and the pixel electrode 25A is charged to the information signal S3. The information signal S4 is transferred to pixel 26A by the same method.

During the periods, T1, T2, T3 and T4, similar information signals are applied to the remaining column conductors, and charge the remaining pixel electrodes to their designated video information.

Figure 8:
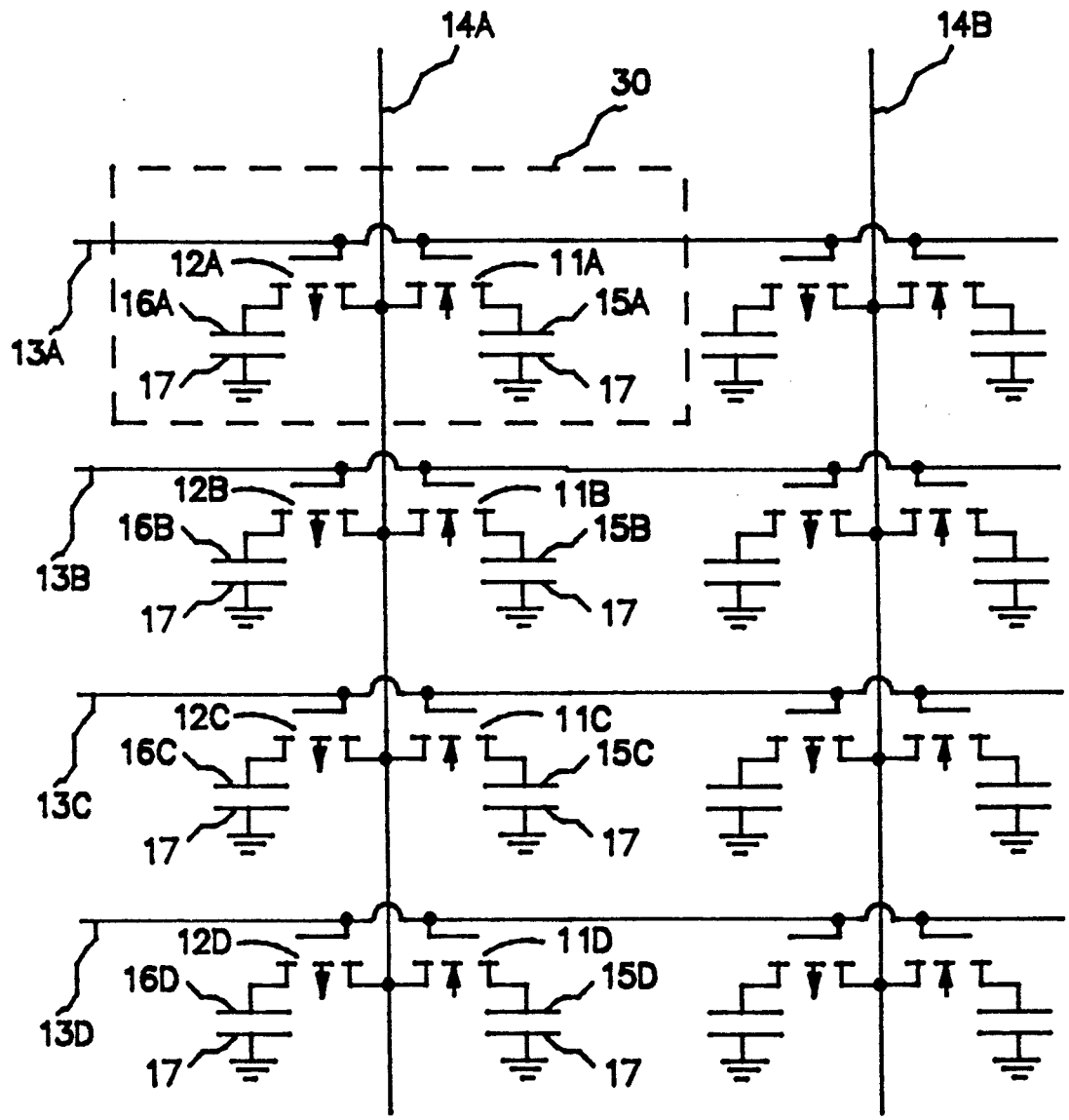
FIG. 8 shows a second type of pixel arrangement of this invention which can reduce one half of column conductors.
Figure 9A:
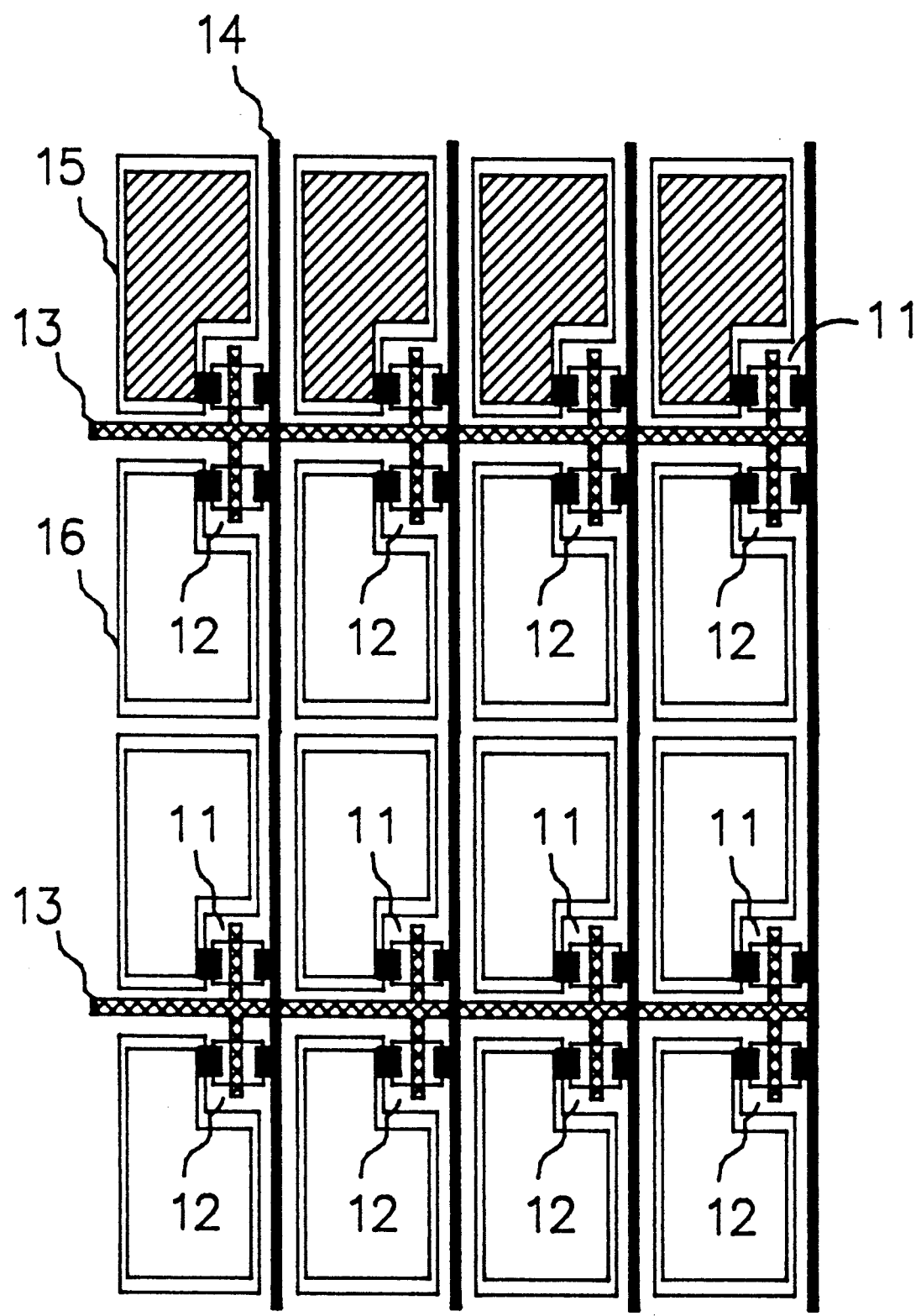
FIG. 9(a) shows the energized pixels of the first type of pixel arrangement during T1 in FIG. 6.
Figure 9B:
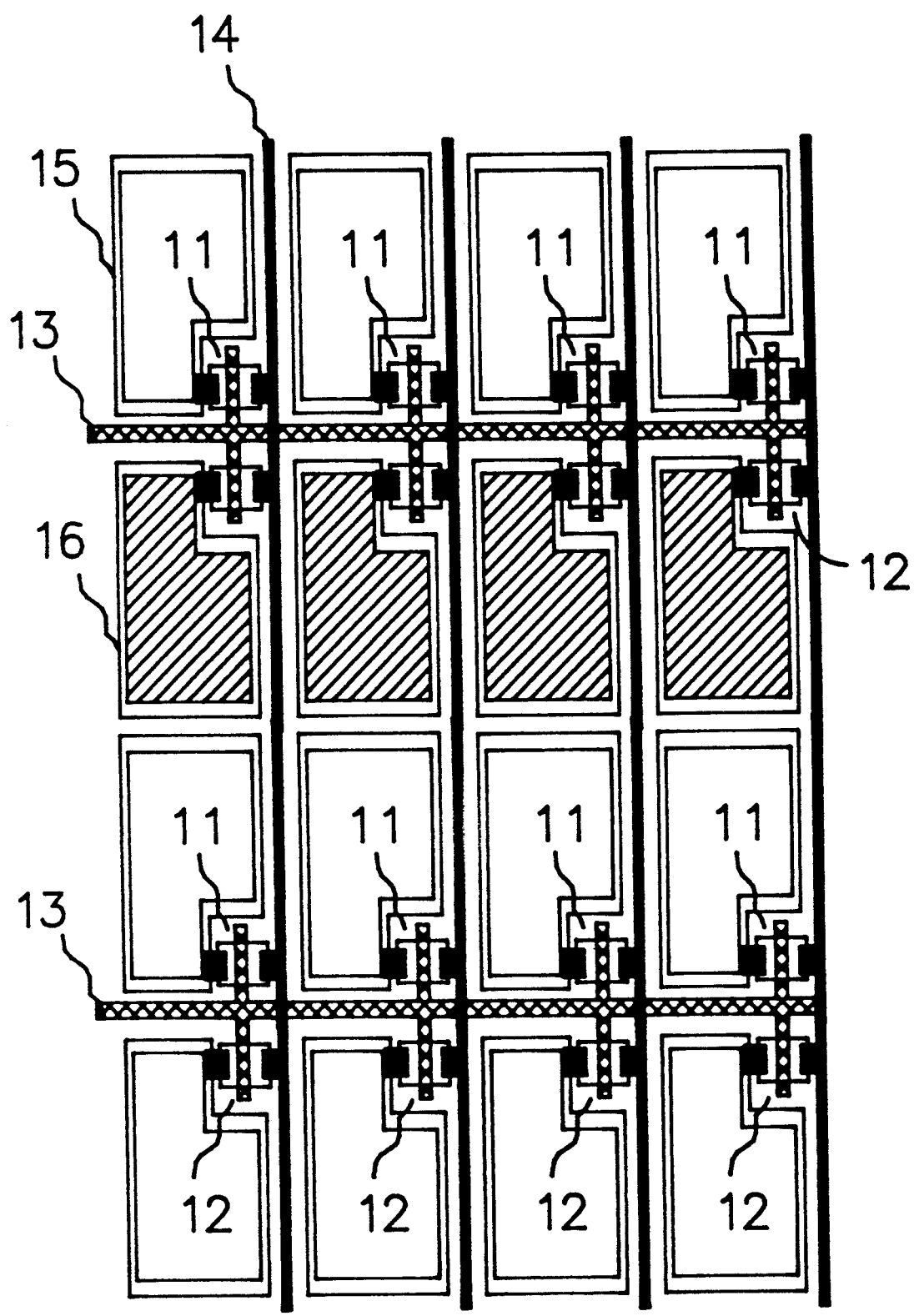
FIG. 9(b) shows the energized pixels of the first type of pixel arrangement during T2 in FIG. 6.
Figure 12:
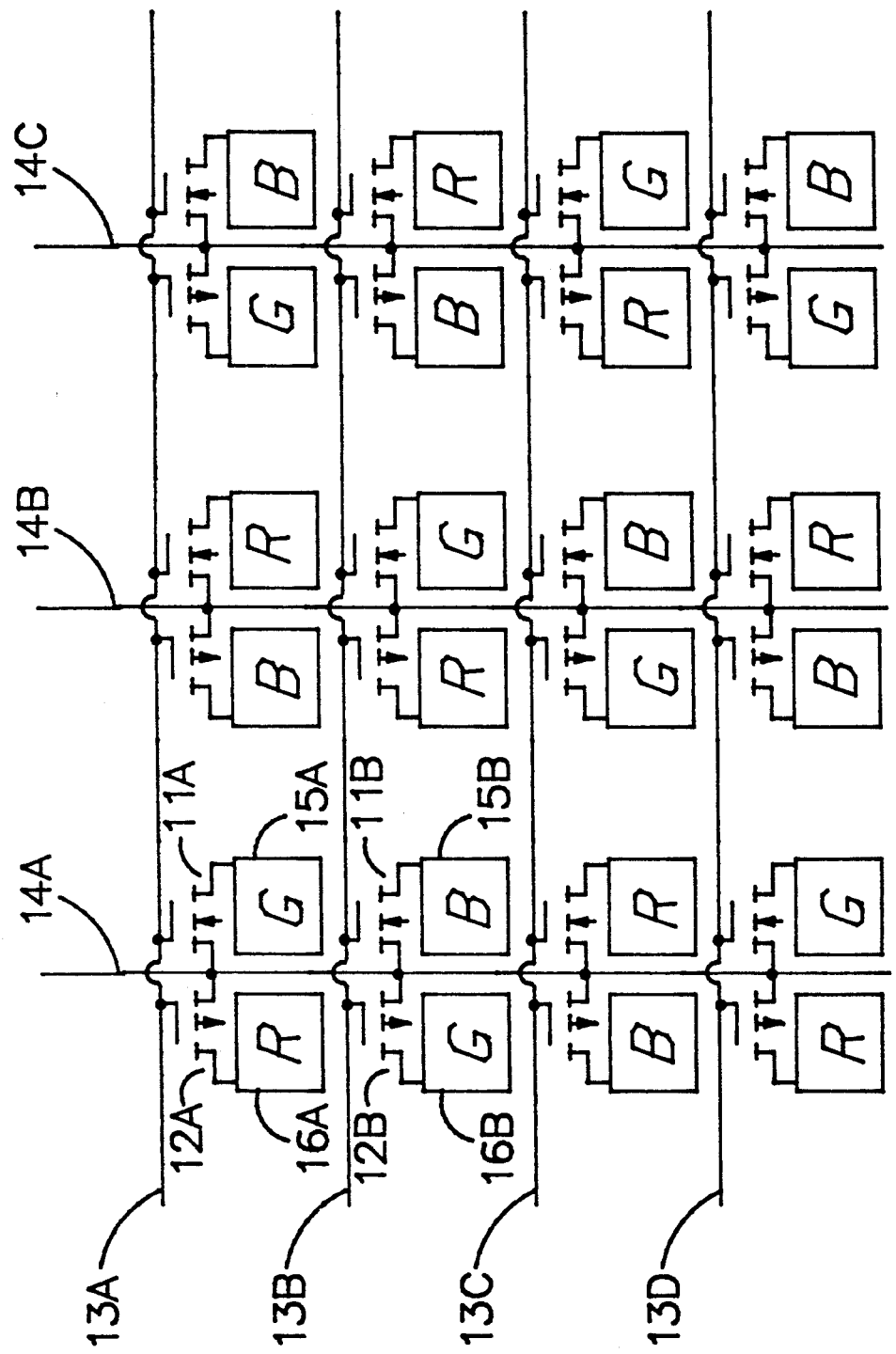
FIG. 12 shows an example of the color filter arrangement of the second type of pixel arrangement.

FIG. 8 shows a second example, which can reduce one half of the column conductors. In this example, two pixels of each group are located on opposite sides of the column conductor 14. Each group, such as that indicated by dotted line 30 comprises an n-channel TFT 11 and a p-channel TFT 12. The n-channel TFT 11 is located at the right side of the column conductor 14, and the p-channel TFT 12 is located on the left side of the column conductor 14, or vice versa. The column conductor 14 is shared by the p-channel TFT 11 and the n-channel TFT 12 in the same group and by other similar groups of pixels in the same column conductor 14. FIG. 10 shows the TFTLCD active matrix TFT array layout of this invention. Compared with FIG. 7(b) for the same pixel dimensions, the total array area of FIG. 10 is smaller than that of FIG. 7(b). Thus, with the same design rule and aperture ratio, the pixel number of this invention can be made higher than that of conventional TFTLCDs. The color filter arrangement is shown in FIG. 12, and the arrangement is similar to that of conventional TFTLCDs.

Figure 11A:
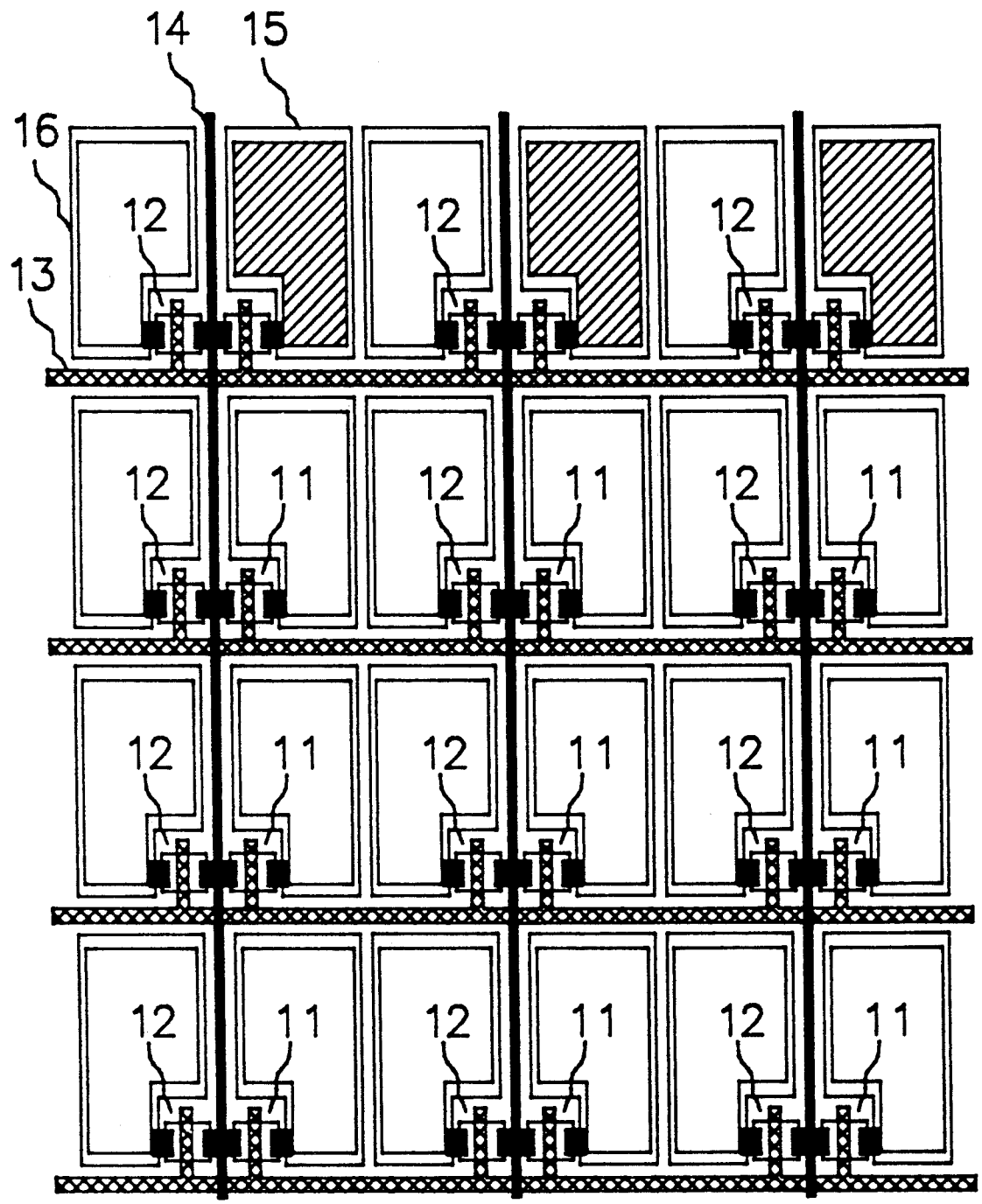
FIG. 11(a) shows the energized pixels of the second type of pixel arrangement during T1 in FIG. 6.
Figure 11B:
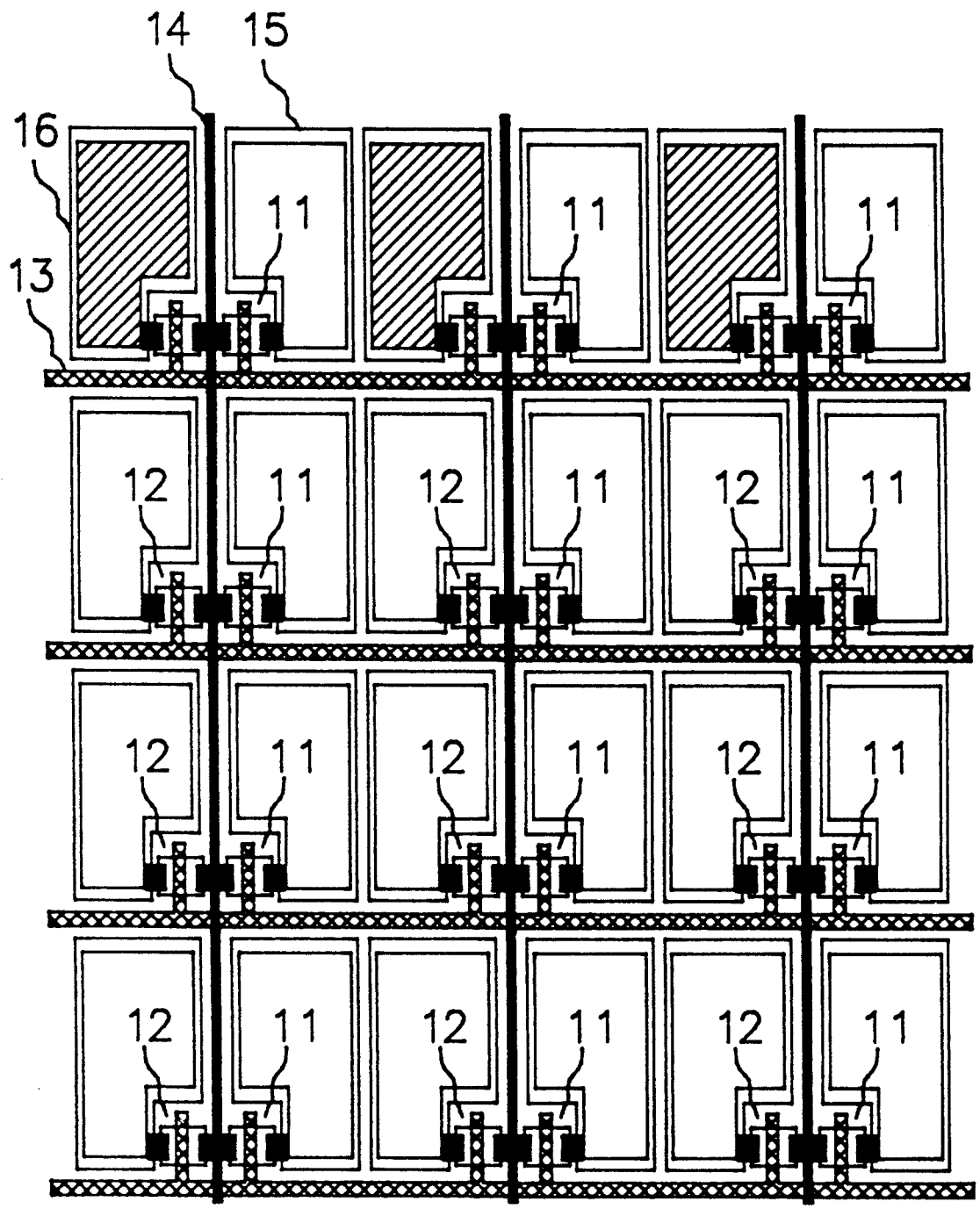
FIG. 11(b) shows the energized pixels of the second type of pixel arrangement during T2 in FIG. 6.

The switching signal applied to the row conductor 13A in FIG. 8 is the same as that in FIG. 6(a), having a positive pulse during T1 and a negative pulse during T2. The duration of T1+T2 corresponds to the duration for one line periods of a TV display. During T1, one half of the pixels of the first line 13A are energized. During T2, the other pixels of the first line 13A are energized, as shown in FIG. 11. After T1+T2, the row conductor 13A is applied with zero voltage. The same waveform is applied to the next row conductor 13B, except that the waveform is delayed for T1+T2. FIG. 6(b) illustrates the waveform applied to conductor 13B, which is the row conductor next to 13A. The waveform is repeated and applied to the row conductors 14 sequentially.

In synchronism with these switching signal sequences, and under the control of the timing and control circuit, video information (data signals) S for the pixels of the dispaly are applied to the relevant column conductor 14. With the same video information shown in FIG. 6(c), the pixel electrodes corresponding to 11A, 12A, 11B and 12B of FIG. 8 are supplied with the voltage of S1, S2, S3 and S4, respectively.

Figure 13:
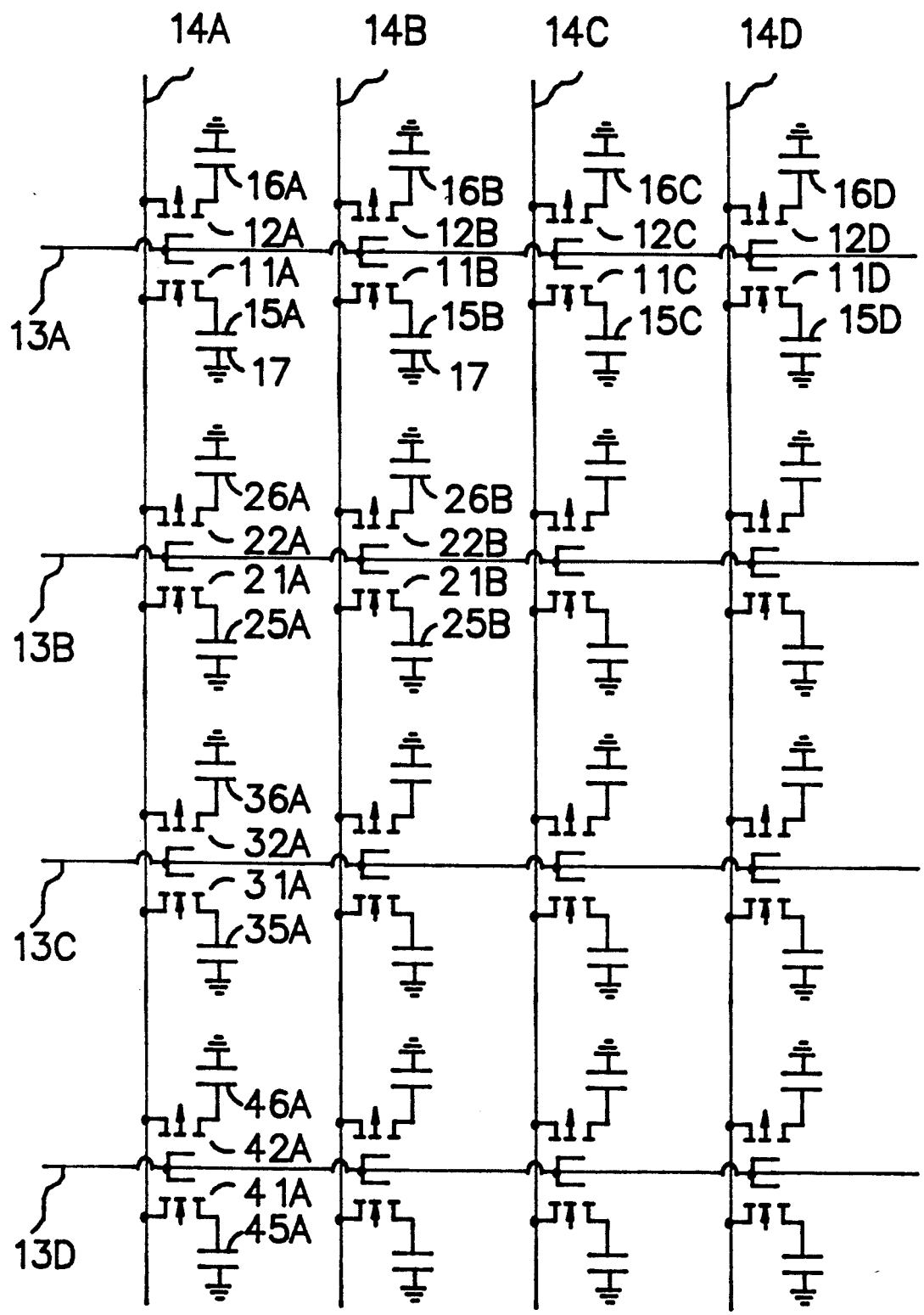
FIG. 13 shows a third type of pixel arrangement of the present invention, in which the p-channel TFTs are placed above the common row conductors and the n-channel TFTs are placed below the common row conductors.
Figure 14:
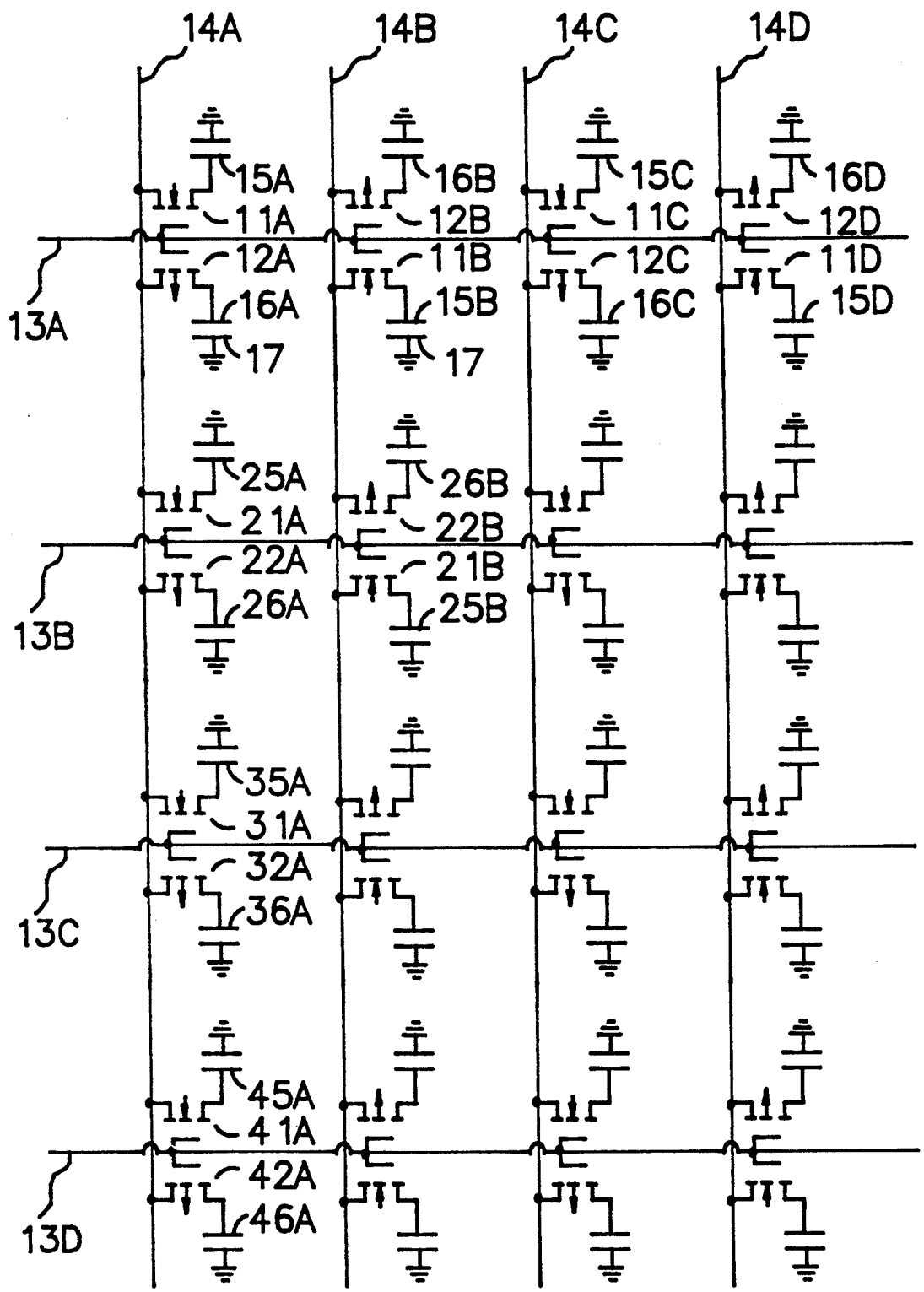
FIG. 14 shows a fourth type of pixel arrangement of the present invention, in which the p-channel TFTs and the n-channel TFTs are alternately placed with respect to the row conductors and the column conductors.
Figure 15:
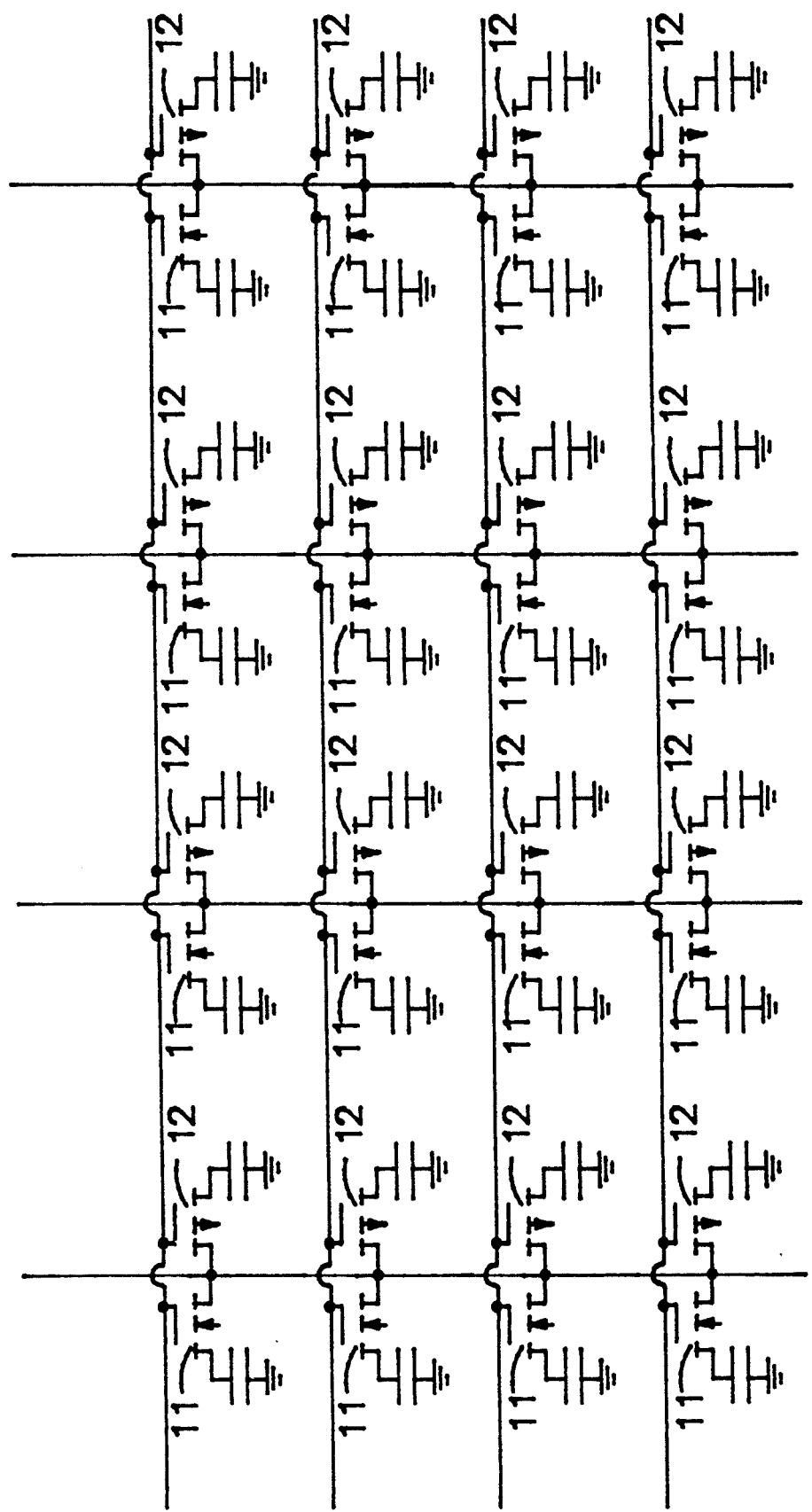
FIG. 15 shows a fifth type of pixel arrangement of the present invention, in which the n-channel TFTs are placed on the left-hand side of the common column conductors and the p-channel TFTs are placed on the right-hand side of the common column conductors.
Figure 16:
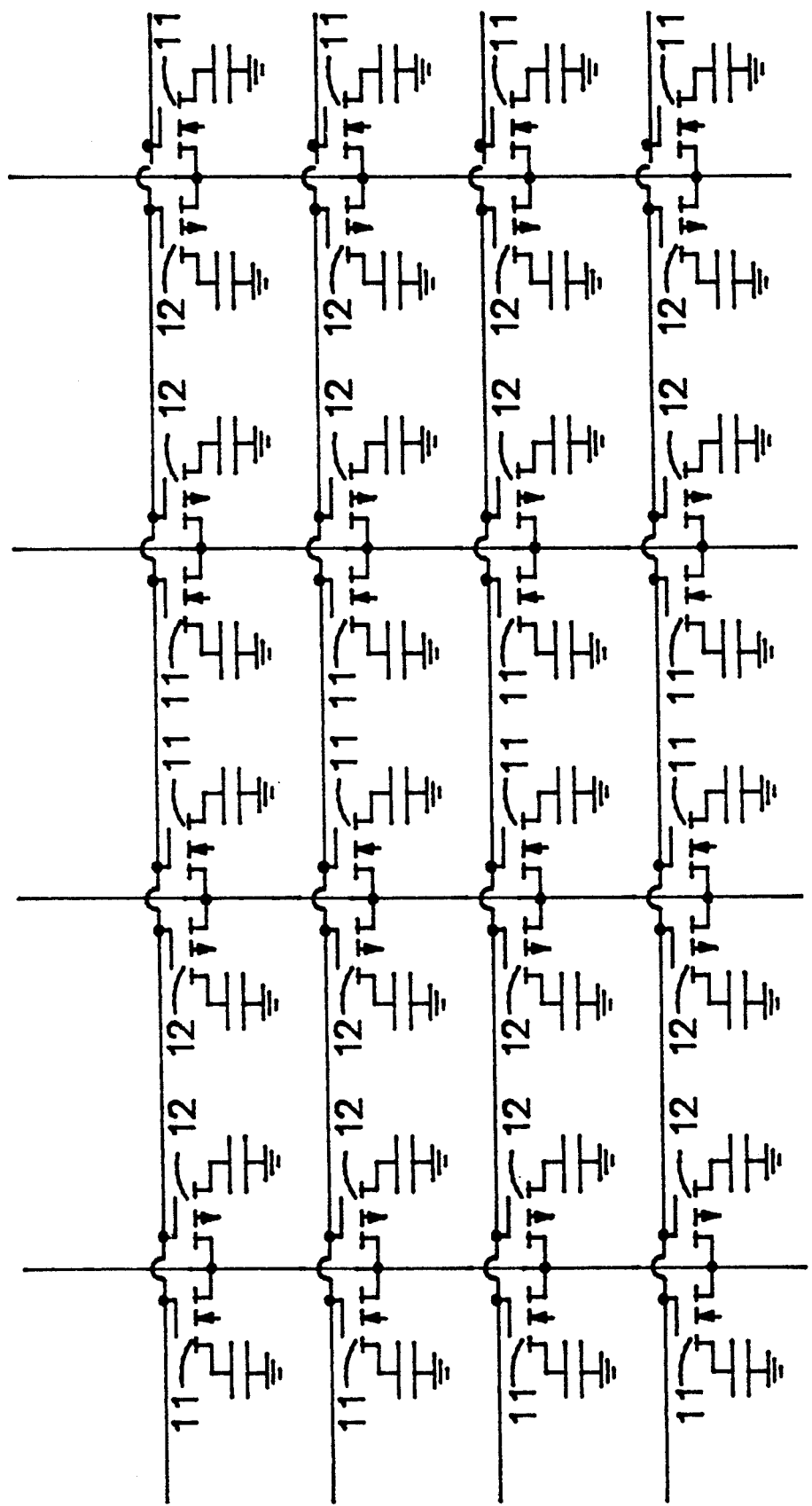
FIG. 16 shows a sixth type of pixel arrangement of the present invention, in which the n-channel TFTs and the p-channel TFTs switch positions for adjacent common column conductors.
Figure 17:
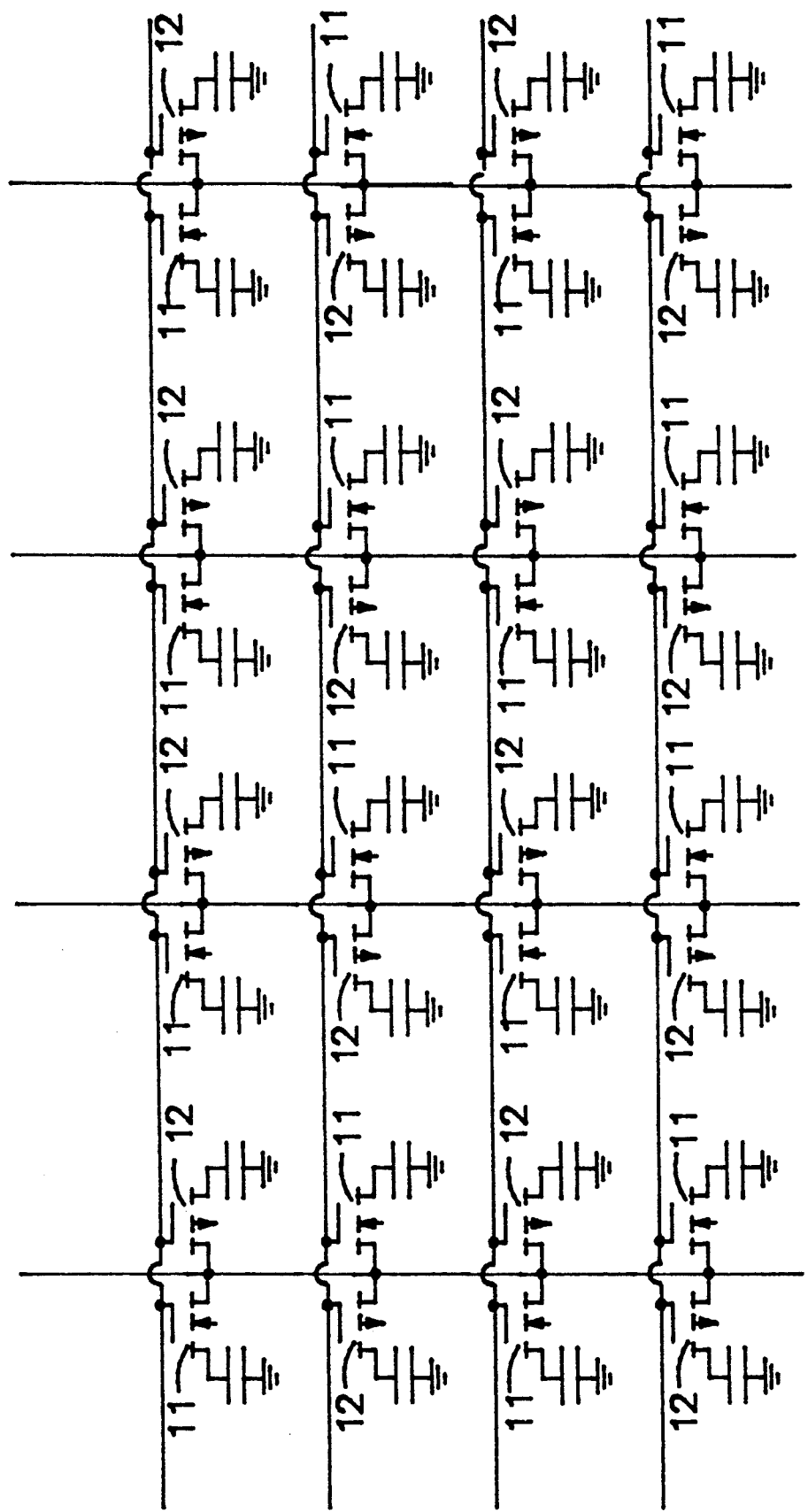
FIG. 17 shows a seventh type of pixel arrangement of the present invention, in which the n-channel TFTs and the p-channel TFTs sharing a common column conductor are alternately placed along the vertical direction.
Figure 18:
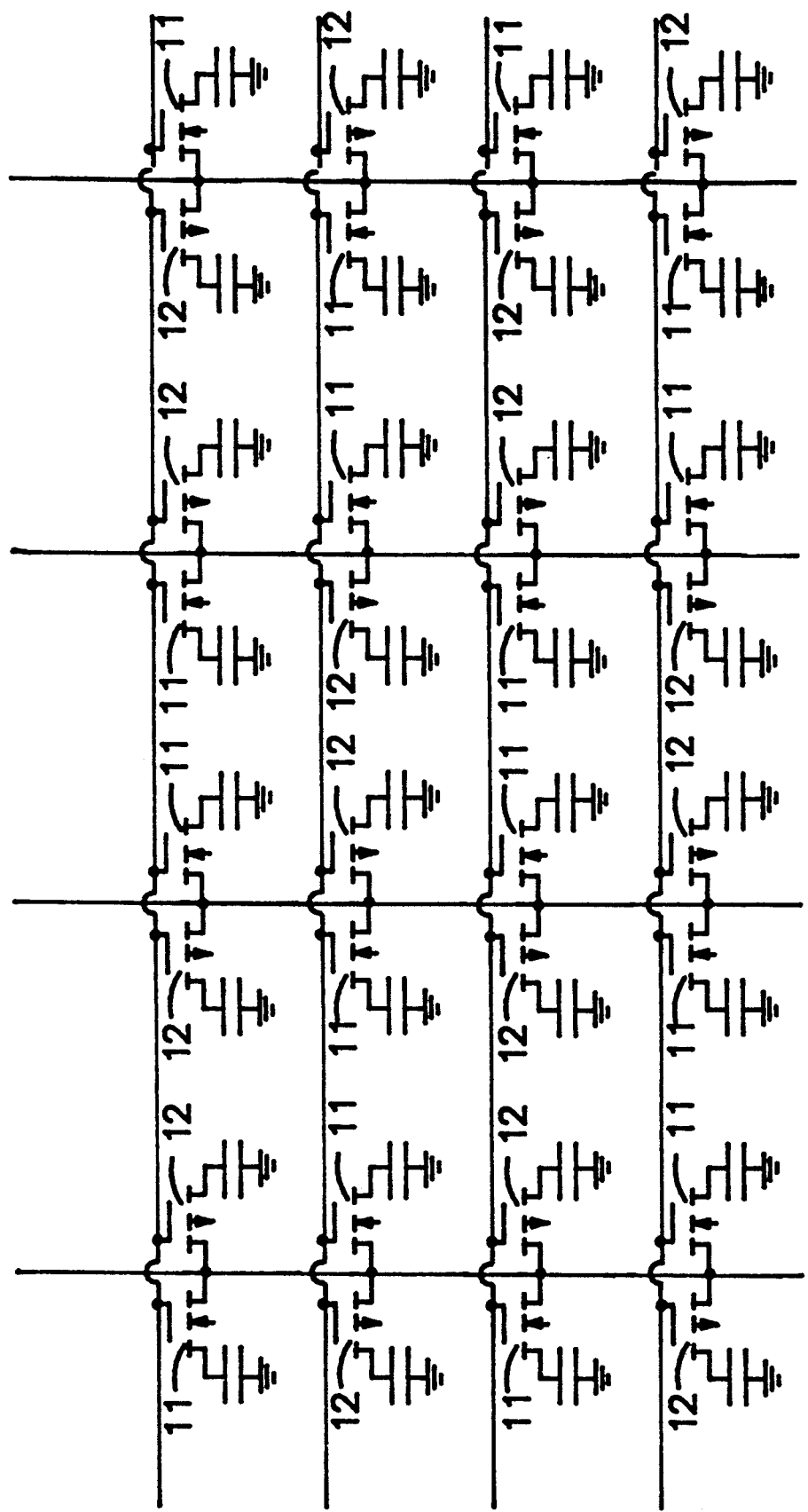
FIG. 18 shows an eighth type of pixel arrangement of the present invention, in which the n-channel TFTs and the p-channel TFTs sharing the same column conductor are alternaately placed along the vertical direction as well as adjacent columns.

In FIG. 3, the n-channel transistors are placed above the common gate conductor and the p-channel transistors are placed below the common gate conductor. Other pixel arrangements are also possible. The n-channel and the p-channel transistors can be alternately or randomly placed above or below the common gate conductor as shown in FIGS. 13, 14. Similarly in FIG. 8, the n-channel and p-channel transistors can be alternately or ramdomly placed with respect to the vertical conductor as shown in FIGS. 15, 16, 17, 18. All these different variations of of the basic arrangement are within the scope of this invention. The timing waveform of the row conductors for these different arrangements can also have many variations. For instance, positive square wave switching signals are applied sequentially to the horizontal scanning lines to turn on all the n-channel TFTs and the corresponding data signals are applied to the pixels. Then, in the same field, negative square switching signals are applied sequentially to the horizontal scanning lines to turn on all the p-channel TFTs and the corresponding data signals are applied to the pixels.

What is claimed is:

1. A thin film transistor active matrix display system comprising:
   a plurality of liquid crystal display picture elements arranged in rows and columns and divided into groups;
   each said group of said pixels containing two said pixels,
   a plurality of scan lines;
   a plurality of data lines;
   each said group addressed by the same scan line and the same data line,
   two switches for connecting said pixels of one of said group with said data line, each one of said switches connected only to one of said pixels,
   a n-channel thin film transistor (TFT) serving as one of said switches,
   a p-channel TFT serving as another one of said switches,
   said two TFTs having common gates connected to said scan line, common drains connected to said data line, and separate sources connected two said pixels in the same group.

2. A thin film transistor active matrix display system according to claim 1, wherein the threshold voltages of the n-channel TFTs and the p-channel TFTs serving as said switches are designed to be higher than the maximum voltage of said data signal.

3. A thin-film transistor active matrix display system according to claim 1, wherein the p-channel TFT and the n-channel TFT in each said group are located on different sides of said scan line, resulting in n/2 total said switching signal conductors, each said scan line connected to m number of said groups, where n is the total number of rows of pixels in said matrix.

4. A thin-film transistor active matrix display system according to claim 3, wherein the switching signal for the scan line comprises a switching waveform which has a positive voltage pulse width which all the pixels connected to the n-channel TFTs of one said row are energized, and a negative voltage pulse width which all the pixels connected to the p-channel TFTs of one said row are energized; and the corresponding data line signals are supplied in synchronism with in said switching waveform.

5. A thin-film transistor active matrix display system according to claim 4, wherein the pulse width of the positive voltage and the pulse width of the negative voltage can be equal or different, and are dependent on the geometries and mobilities of the n-channel TFTs and the p-channel TFTs.

6. A thin film transistor active matrix display system according to claim 3, wherein the duration of the positive pulse corresponding to the duration of the scan signal applied to n-channel TFTs in a said scan line is equal to the line scanning period of television display, whereas the duration of the negative pulse corresponding to the duration of the scan signal applied to p-channel TFTs in said scan line is equal to the line scanning period of a television display.

7. A thin-film transistor active matrix display system according to claim 3, wherein the n-channel thin-film transistor of each said group is located above the row conductor, and the p-channel thin-film transistor of each said group is located below the row conductor.

8. A thin-film transistor active matrix display system according to claim 3, wherein the n-channel thin-film transistors are located below the row conductor, and the p-channel thin-film transistors are located above the row conductor.

9. A thin-film transistor active matrix display system according to claim 3, wherein the n-channel thin-film transistors and the p-channel thin-film transistors are alternately or disorderly placed with respect to the row conductor.

10. A thin-film trnasistor active matrix display system according to claim 1, wherein the p-channel TFT and the n-channel TFT in each group are located on different sides of said data line, resulting in m/2 total said data lines, each connected to n number of said groups, where m is the total number of columns of pixels in said matrix.

11. A matrix display system according to claim 4, wherein during the positive switching pulse on said scan line, every two energized pixels on an energized scan line are separated by an unenergized pixel; and during the negative switching pulse on said scan line, every two energized pixels on the energized scan line are also separated by an unenergized pixel.

12. A thin-film trnasistor active matrix display system according to claim 10, wherein the n-channel thin-film transistor of each said group is located on the left-hand side of the column conductor, and the p-channel thin-film transistor of each said group is located on the right-hand side of the column conductor.

13. A thin-film transistor active matrix display system according to claim 10, wherein the n-channel thin-film transistor of each said group is located on the right-hand side of the column conductor, and the p-channel thin-film transistor of each said group is located on the left-hand side of the column conductor.

14. A thin-film transistor active matrix display system according to claim 10, wherein the n-channel thin-film transistors and the p-channel thin-film transistors are alternately or disorderly located with respect to the column conductor.

15. A thin-film trnasistor active matrix display system according to claim 1, wherein the TFTs are made of polycrystalline silicon or amorphous silicon or other semiconductor materials.

16. A thin-film transistor active matrix display system according to claim 1, wherein every three successive pixels are arranged to display three primary colors.

* * * * *